(12) United States Patent
Chatterjee et al.

(10) Patent No.: US 10,392,538 B2
(45) Date of Patent: Aug. 27, 2019

(54) ADHESIVE COMPOSITIONS COMPRISING A SILSESQUIOXANE POLYMER CROSSLINKER, ARTICLES AND METHODS

(71) Applicant: 3M INNOVATIVE PROPERTIES COMPANY, St. Paul, MN (US)

(72) Inventors: Joon Chatterjee, Bloomington, MN (US); Jitendra S. Rathore, Woodbury, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 136 days.

(21) Appl. No.: 15/305,815

(22) PCT Filed: Jun. 5, 2015

(86) PCT No.: PCT/US2015/034325
§ 371 (c)(1),
(2) Date: Oct. 21, 2016

(87) PCT Pub. No.: WO2015/195355
PCT Pub. Date: Dec. 23, 2015

(65) Prior Publication Data
US 2017/0088756 A1    Mar. 30, 2017

Related U.S. Application Data

(60) Provisional application No. 62/014,847, filed on Jun. 20, 2014.

(51) Int. Cl.
*C09J 133/08*    (2006.01)
*C09J 151/00*    (2006.01)
(Continued)

(52) U.S. Cl.
CPC ........... *C09J 151/003* (2013.01); *C08L 83/00* (2013.01); *C09J 7/22* (2018.01); *C09J 7/38* (2018.01);
(Continued)

(58) Field of Classification Search
None
See application file for complete search history.

(56) References Cited

U.S. PATENT DOCUMENTS 3,775,452 A    11/1973    Karstedt
4,351,875 A    9/1982    Arkens
(Continued)

FOREIGN PATENT DOCUMENTS

CN    1827668    9/2006
CN    1887921    1/2007
(Continued)

OTHER PUBLICATIONS

Human translation of JP 04178411 A (Year: 1992).*
(Continued)

*Primary Examiner* — Frank D Ducheneaux
(74) *Attorney, Agent, or Firm* — Carolyn A. Fischer

(57) ABSTRACT

A pressure sensitive adhesive composition is described comprising at least one low Tg (meth)acrylic polymer, and at least one silsesquioxane polymer crosslinker comprising a plurality of ethylenically unsaturated groups. The low Tg (meth)acrylic polymer typically has a Tg no greater than 10° C. In some embodiments, the low Tg (meth)acrylic polymer comprises at least 50, 55, 60, 65, or 70 wt-% of polymerized units derived from low Tg ethylenically unsaturated monomer(s). The low Tg ethylenically unsaturated monomer(s) is typically an alkyl (meth)acrylate comprising 4 to 20 carbon atoms. Also described are pressure sensitive adhesive articles and methods of preparing such articles.

19 Claims, 1 Drawing Sheet

(51) Int. Cl.
*C09J 7/22* (2018.01)
*C09J 7/38* (2018.01)
*C08L 83/00* (2006.01)
*C08G 77/00* (2006.01)
*C08G 77/20* (2006.01)
*C08G 77/04* (2006.01)

(52) U.S. Cl.
CPC .......... *C09J 133/08* (2013.01); *C08G 77/045* (2013.01); *C08G 77/20* (2013.01); *C09J 2201/606* (2013.01); *C09J 2205/10* (2013.01); *C09J 2205/114* (2013.01); *C09J 2451/00* (2013.01)

(56) References Cited

U.S. PATENT DOCUMENTS

| | | |
|---|---|---|
| 4,415,615 A | 11/1983 | Esmay |
| 4,510,094 A | 4/1985 | Drahnak |
| 4,530,879 A | 7/1985 | Drahnak |
| 4,535,485 A | 8/1985 | Ashman |
| 4,600,484 A | 7/1986 | Drahnak |
| 4,723,978 A | 2/1988 | Clodgo |
| 4,732,934 A | 3/1988 | Hathaway |
| 4,761,358 A | 8/1988 | Hosoi |
| 4,788,252 A | 11/1988 | De Boer |
| 4,879,362 A | 11/1989 | Morgan |
| 4,885,209 A | 12/1989 | Lindner |
| 4,889,901 A | 12/1989 | Shama |
| 4,948,837 A | 8/1990 | Wittmann |
| 4,963,619 A | 10/1990 | Wittmann |
| 4,997,260 A | 3/1991 | Honjo |
| 5,030,699 A | 7/1991 | Motoyama |
| 5,057,577 A | 10/1991 | Matsuo |
| 5,073,595 A | 12/1991 | Almer |
| 5,145,886 A | 9/1992 | Oxman |
| 5,178,947 A | 1/1993 | Charmot |
| 5,188,899 A | 2/1993 | Matsumoto |
| 5,212,237 A | 5/1993 | Siol |
| 5,219,931 A | 6/1993 | Siol |
| 5,223,586 A | 6/1993 | Mautner |
| 5,278,451 A | 1/1994 | Adachi |
| 5,360,878 A | 11/1994 | Shen |
| 5,506,279 A | 4/1996 | Babu |
| 5,602,221 A | 2/1997 | Bennett |
| 5,609,925 A | 3/1997 | Camilletti |
| 5,695,678 A | 12/1997 | Edamura |
| 5,773,485 A | 6/1998 | Bennett |
| 5,814,685 A * | 9/1998 | Satake ................. C09D 11/326 347/100 |
| 5,902,836 A | 5/1999 | Bennett |
| 6,376,078 B1 | 4/2002 | Inokuchi |
| 6,624,214 B2 | 9/2003 | Zimmer |
| 6,627,314 B2 | 9/2003 | Matyjaszewski |
| 6,743,510 B2 | 6/2004 | Ochiai |
| 6,852,781 B2 | 2/2005 | Savu |
| 6,927,301 B2 | 8/2005 | Laine |
| 7,056,840 B2 | 6/2006 | Miller |
| 7,081,295 B2 | 7/2006 | James |
| 7,241,437 B2 | 7/2007 | Davidson |
| 7,385,020 B2 | 6/2008 | Anderson |
| 7,488,539 B2 | 2/2009 | Kozakai |
| 7,723,438 B2 | 5/2010 | Hedrick |
| 7,976,585 B2 | 7/2011 | Cremer |
| 7,985,523 B2 | 7/2011 | Zhou |
| 8,012,583 B2 | 9/2011 | Wu |
| 8,071,132 B2 | 12/2011 | Adair |
| 8,084,177 B2 | 12/2011 | Zhou |
| 8,168,357 B2 | 5/2012 | Wu |
| 8,173,342 B2 | 5/2012 | Wu |
| 8,323,803 B2 | 12/2012 | Wu |
| 8,329,301 B2 | 12/2012 | Wu |
| 8,431,220 B2 | 4/2013 | Wu |
| 8,758,854 B2 | 6/2014 | Ishii |
| 2004/0166077 A1 | 8/2004 | Toumi |
| 2004/0247549 A1 | 12/2004 | Lu |
| 2005/0025820 A1 | 2/2005 | Kester |
| 2005/0215807 A1 | 9/2005 | Morimoto |
| 2007/0073024 A1 | 3/2007 | Wariishi |
| 2007/0167552 A1 | 7/2007 | Stoeppelmann |
| 2007/0213474 A1 | 9/2007 | Ebenhoch |
| 2008/0045631 A1 | 2/2008 | Henn |
| 2008/0051487 A1 * | 2/2008 | Kumon ................. C08F 283/12 522/146 |
| 2008/0057431 A1 | 3/2008 | Lai |
| 2008/0119120 A1 | 5/2008 | Zuniga |
| 2008/0254077 A1 | 10/2008 | Prigent |
| 2008/0279901 A1 | 11/2008 | Prigent |
| 2008/0286467 A1 | 11/2008 | Allen |
| 2009/0162650 A1 | 6/2009 | Hong |
| 2009/0197071 A1 | 8/2009 | Cramail |
| 2009/0215927 A1 | 8/2009 | Mohite |
| 2009/0312457 A1 | 12/2009 | Tokumitsu |
| 2010/0280151 A1 | 11/2010 | Nguyen |
| 2011/0045387 A1 | 2/2011 | Allen |
| 2011/0054074 A1 | 3/2011 | Jonschker |
| 2011/0083887 A1 | 4/2011 | Brock |
| 2011/0117145 A1 | 5/2011 | Inokuchi |
| 2011/0223404 A1 | 9/2011 | Wu |
| 2012/0132108 A1 | 5/2012 | Ishihara |
| 2012/0205315 A1 | 8/2012 | Liu |
| 2012/0288692 A1 | 11/2012 | Broyles |
| 2012/0298574 A1 | 11/2012 | Kang |
| 2013/0101934 A1 | 4/2013 | Chiba |
| 2013/0102733 A1 | 4/2013 | Chen |
| 2013/0139963 A1 | 6/2013 | Lee |
| 2013/0318863 A1 | 12/2013 | Chang |
| 2013/0343969 A1 | 12/2013 | Bromberg |
| 2014/0023855 A1 | 1/2014 | Masuda |
| 2014/0030441 A1 | 1/2014 | Nagai |
| 2014/0135413 A1 | 5/2014 | Yoo |
| 2014/0178698 A1 | 6/2014 | Rathore |

FOREIGN PATENT DOCUMENTS

| | | |
|---|---|---|
| CN | 101376812 | 3/2009 |
| CN | 101550217 | 10/2009 |
| CN | 101717565 | 6/2010 |
| CN | 101724394 | 6/2010 |
| CN | 101781390 | 7/2010 |
| CN | 102432920 | 5/2012 |
| CN | 102532554 | 7/2012 |
| CN | 102585073 | 7/2012 |
| CN | 102718930 | 10/2012 |
| CN | 103012689 | 4/2013 |
| CN | 103030752 | 4/2013 |
| CN | 103113812 | 5/2013 |
| CN | 103173041 | 6/2013 |
| CN | 103275273 | 9/2013 |
| CN | 103289021 | 9/2013 |
| EP | 0254418 | 1/1988 |
| EP | 0315226 | 5/1989 |
| EP | 0373941 | 6/1990 |
| EP | 0398701 | 11/1990 |
| EP | 0420155 | 4/1991 |
| EP | 0420585 | 4/1991 |
| EP | 0459257 | 12/1991 |
| EP | 0556953 | 8/1993 |
| EP | 0958805 | 11/1999 |
| EP | 2155761 | 2/2010 |
| JP | S55-111148 | 8/1980 |
| JP | S62-124159 | 6/1987 |
| JP | S62-130807 | 6/1987 |
| JP | S62-255957 | 11/1987 |
| JP | S63-291962 | 11/1988 |
| JP | 2541566 | 1/1989 |
| JP | 01090201 | 4/1989 |
| JP | H01-096265 | 4/1989 |
| JP | H01-195458 | 8/1989 |
| JP | H02-233537 | 9/1990 |
| JP | H03-002808 | 1/1991 |
| JP | H03-154007 | 7/1991 |
| JP | H04-050243 | 2/1992 |
| JP | H04-110351 | 4/1992 |

(56) References Cited

FOREIGN PATENT DOCUMENTS

| | | |
|---|---|---|
| JP | 04178411 | 6/1992 |
| JP | H04-173863 | 6/1992 |
| JP | H04-175370 | 6/1992 |
| JP | H04-178411 | 6/1992 |
| JP | H05-271362 | 10/1993 |
| JP | H08-134308 | 5/1996 |
| JP | H11-060931 | 3/1999 |
| JP | H11-116681 | 4/1999 |
| JP | 2000-063674 | 2/2000 |
| JP | 2000-157928 | 6/2000 |
| JP | 2000-169591 | 6/2000 |
| JP | 2001-106925 | 4/2001 |
| JP | 2002-121536 | 4/2002 |
| JP | 2002-327030 | 11/2002 |
| JP | 2003-055459 | 2/2003 |
| JP | 2003-226835 | 8/2003 |
| JP | 3817192 | 9/2003 |
| JP | 2004-292541 | 10/2004 |
| JP | 2005-014293 | 1/2005 |
| JP | 2006-160880 | 6/2006 |
| JP | 2006-335978 | 12/2006 |
| JP | 2007-090865 | 4/2007 |
| JP | 2007-146148 | 6/2007 |
| JP | 2007-146150 | 6/2007 |
| JP | 2008-056751 | 3/2008 |
| JP | 2008-115302 | 5/2008 |
| JP | 2008-127405 | 6/2008 |
| JP | 2008-144053 | 6/2008 |
| JP | 2008-201908 | 9/2008 |
| JP | 2008-303358 | 12/2008 |
| JP | 2009-009045 | 1/2009 |
| JP | 2009-024077 | 2/2009 |
| JP | 2009-029893 | 2/2009 |
| JP | 2009-051934 | 3/2009 |
| JP | 2009-091466 | 4/2009 |
| JP | 2009-155496 | 7/2009 |
| JP | 2009-191120 | 8/2009 |
| JP | 2009-253203 | 10/2009 |
| JP | 2009-280706 | 12/2009 |
| JP | 2010-005613 | 1/2010 |
| JP | 2010-095619 | 4/2010 |
| JP | 2010-116442 | 5/2010 |
| JP | 2010-128080 | 6/2010 |
| JP | 2010-144153 | 7/2010 |
| JP | 2010-175798 | 8/2010 |
| JP | 2010-229303 | 10/2010 |
| JP | 2010-260881 | 11/2010 |
| JP | 2010-265410 | 11/2010 |
| JP | 2010-275521 | 12/2010 |
| JP | 2011-063482 | 3/2011 |
| JP | 2011-081123 | 4/2011 |
| JP | 2011-099074 | 5/2011 |
| JP | 2011-115755 | 6/2011 |
| JP | 2011-132087 | 7/2011 |
| JP | 2012-036335 | 2/2012 |
| JP | 2012-036336 | 2/2012 |
| JP | 2012-144661 | 8/2012 |
| JP | 2013-010843 | 1/2013 |
| JP | 2013-022791 | 2/2013 |
| JP | 2013-076075 | 4/2013 |
| JP | 2013-249371 | 12/2013 |
| JP | 2013-251103 | 12/2013 |
| JP | 2014-005363 | 1/2014 |
| JP | 2014-007058 | 1/2014 |
| KR | 2006-017891 | 2/2006 |
| KR | 2009-067315 | 6/2009 |
| KR | 2010-075235 | 7/2010 |
| KR | 2011-038471 | 4/2011 |
| KR | 2012-021926 | 3/2012 |
| KR | 2013-026991 | 3/2013 |
| KR | 2013-067401 | 6/2013 |
| WO | 2005-100426 | 10/2005 |
| WO | 2007-103654 | 9/2007 |
| WO | 2008-124080 | 10/2008 |
| WO | 2008-147072 | 12/2008 |
| WO | WO 2009-002660 | 12/2008 |
| WO | WO 2009-005880 | 1/2009 |
| WO | WO 2009-008452 | 1/2009 |
| WO | WO 2009-085926 | 7/2009 |
| WO | WO 2009-128441 | 10/2009 |
| WO | WO 2010-055632 | 5/2010 |
| WO | WO 2013-015469 | 1/2013 |
| WO | WO 2013-087365 | 6/2013 |
| WO | WO 2013-087366 | 6/2013 |
| WO | WO 2013-087368 | 6/2013 |
| WO | WO 2014-024379 | 2/2014 |
| WO | WO 2014-099699 | 6/2014 |
| WO | WO 2015-088932 | 6/2015 |
| WO | WO 2015-195268 | 12/2015 |
| WO | WO 2015-195391 | 12/2015 |

OTHER PUBLICATIONS

"Norrish Reaction", Wikipedia, [Retrieved from the Internet on Jun. 12, 2014], URL <http://en.wikipedia.org/wiki/Norrish_reaction>, pp. 4.

Boardman, "($\eta^5$-Cyclopentadienyl) Trialkylplatinum Photohydrosilylation Catalysts. Mechanism of Active Catalyst Formation and Preparation of a Novel Bis (Silyl) Platinum Hydride," Organometallics, 1992, vol. 11, No. 12, pp. 4194-4201.

Burget, "Kinetic Study of the Photoactivated Hydrosilylation of Some β-Dicarbonyl Complexes of Trialkylplatinum (IV)", Journal of Photochemistry and Photobiology A: Chemistry, 1996, vol. 97, pp. 163-170.

Ciba, "Coating Effects Segment IRGACURE 651", 2001, 2pgs.

Dow, "Dow Corning (R) 2-7466 Resin", Material Data Sheet, 2013, 2pgs.

Jakuczek, "Well-defined core-shell structures based on silsesquioxane microgels: Grafting of polystyrene via ATRP and product characterization", Polymer, 2008, vol. 49, pp. 843-856.

Lewis, "Platinum(II) Bis(β-Diketones) as Photoactivated Hydrosilation Catalysts", Inorganic Chemistry, 1995, vol. 34, No. 12, pp. 3182-3189.

Su, "New Photocurable Acrylic/Silsesquioxane Hybrid Optical Materials: Synthesis, Properties, and Patterning", Macromolecular Materials and Engineering, 2007, vol. 292, pp. 666-673.

Wang, "Photoactivated Hydrosilylation Reaction of Alkynes," Journal of Organometallic Chemistry, 2003, vol. 665, pp. 1-6.

International Search Report for PCT International Application No. PCT/US2015/034325, dated Jul. 17, 2015, 3pgs.

* cited by examiner

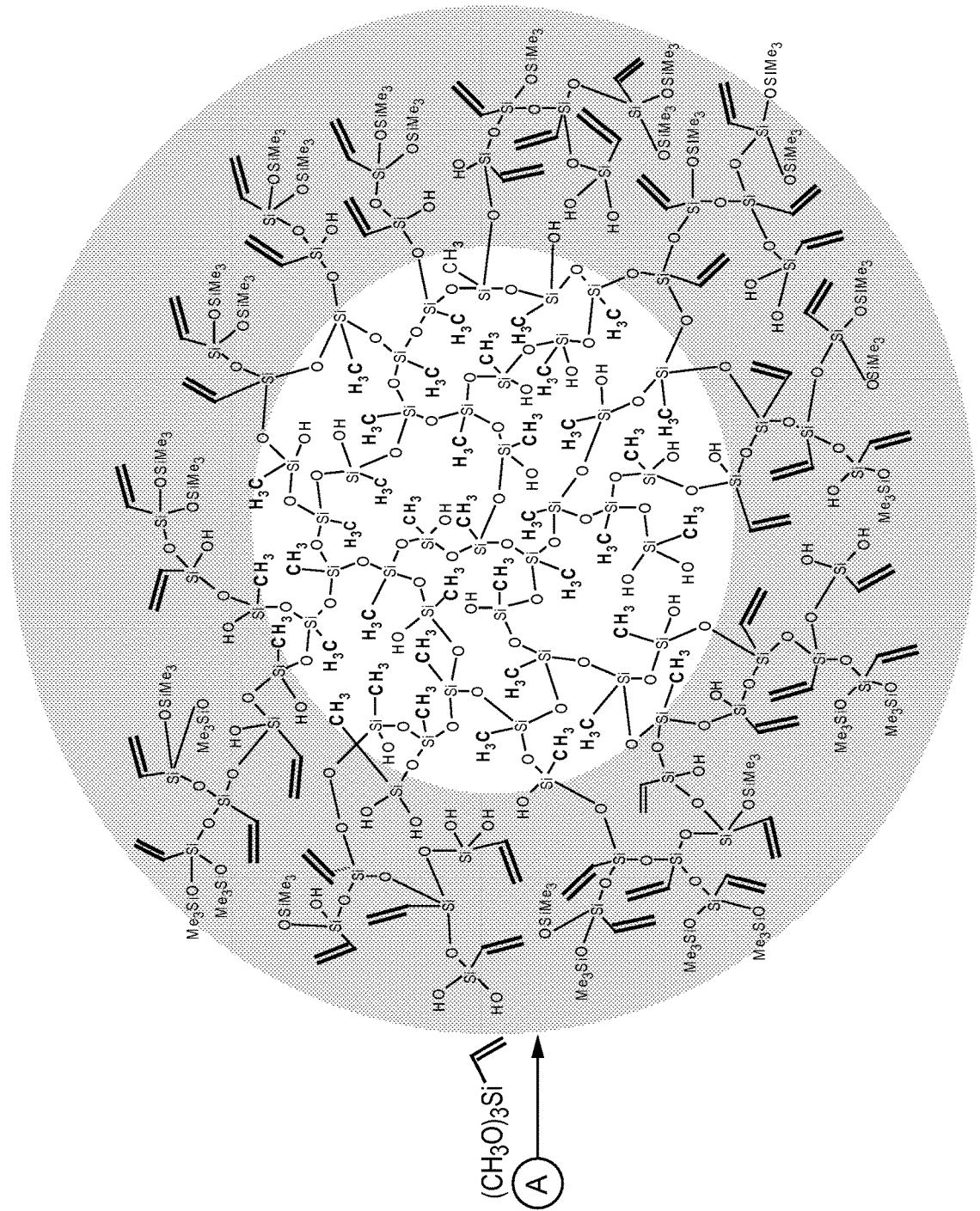

ADHESIVE COMPOSITIONS COMPRISING A SILSESQUIOXANE POLYMER CROSSLINKER, ARTICLES AND METHODS

CROSS REFERENCE TO RELATED APPLICATIONS

This application is a national stage filing under 35 U.S.C. 371 of PCT/US2015/034325, filed Jun. 5, 2015, which claims the benefit of U.S. Provisional Application No. 62/014,847, filed Jun. 20, 2014, the disclosure of which is incorporated by reference in its/their entirety herein.

SUMMARY

In one embodiment, a pressure sensitive adhesive composition is described comprising at least one low Tg (meth) acrylic polymer, and at least one silsesquioxane polymer crosslinker comprising a plurality of ethylenically unsaturated groups. The low Tg (meth)acrylic polymer typically has a Tg no greater than 10° C. In some embodiments, the low Tg (meth)acrylic polymer comprises at least 50, 55, 60, 65, or 70 wt-% of polymerized units derived from low Tg ethylenically unsaturated monomer(s). The low Tg ethylenically unsaturated monomer(s) is typically an alkyl (meth) acrylate comprising 4 to 20 carbon atoms.

The silsesquioxane polymer crosslinker typically comprises a three-dimensional branched network having the formula:

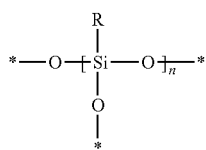

wherein:
the oxygen atom at the * is bonded to another Si atom within the three-dimensional branched network;
R is an organic group comprising an ethylenically unsaturated group;
R2 is an organic group that is not an ethylenically unsaturated group; and
n is at least 2 and m is at least 1.

The silsesquioxane polymer crosslinker may comprise a core comprising a first silsesquioxane polymer and an outer layer comprising a second (different) silsesquioxane polymer bonded to the core wherein the silsesquioxane polymer of the core, outer layer, or a combination thereof comprises ethylenically unsaturated groups.

In some embodiments, the silsesquioxane polymer crosslinker comprises terminal groups having the formula —Si$(R^3)_3$ wherein $R^3$ is independently selected from alkyl, aryl, aralkyl, or alkaryl; optionally further comprising substituents.

In favored embodiments, the ethylenically unsaturated groups of the silsesquioxane polymer are vinyl, vinyl ether, alkenyl or combinations thereof.

Also described are pressure sensitive adhesive articles and method of preparing adhesive articles.

BRIEF DESCRIPTION OF THE DRAWINGS

FIG. 1 is an illustrative schematic of a silsesquioxane polymer crosslinker.

DETAILED DESCRIPTION

The present disclosure describes adhesives that can be prepared from composition comprising a low Tg (meth) acrylic polymer, as well as articles. In some embodiments, the adhesive is a pressure sensitive adhesive (PSA), prior to crosslinking. In other embodiments, the crosslinked adhesive is a pressure sensitive adhesive (PSA). A PSA generally provides a suitable balance of tack, peel adhesion, and shear holding power. Further, the storage modulus of a PSA at the application temperature, typically room temperature (25° C.), is generally less than $3\times10^6$ dynes/cm$^2$ (i.e. $3\times10^5$ Pa) at a frequency of 1 Hz. In some embodiments, the adhesive is a PSA at an application temperature that is greater than room temperature. For example, the application temperature may be 30, 35, 40, 45, 50, 55, or 65° C. In this embodiment, the storage modulus of the adhesive at room temperature (25° C.) can be greater than $3\times10^6$ dynes/cm$^2$ at a frequency of 1 Hz.

The term "alkyl" includes straight-chained, branched, and cyclic alkyl groups and includes both unsubstituted and substituted alkyl groups. Unless otherwise indicated, the alkyl groups typically contains from 1 to 30 or 1-20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

The term heteroalkyl refers to an alkyl group, as just defined, having at least one catenary carbon atom (i.e. in-chain) replaced by a catenary heteroatom such as O, S, or N.

The term "aryl" refers to a substituent derived from an aromatic ring and includes both unsubstituted and substituted aryl groups. Examples of "aryl" include phenyl, halogenated pheny, and the like.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of alkylene groups include, but are not limited to, methylene, ethylene, 1,3-propylene, 1,2-propylene, 1,4-butylene, 1,4-cyclohexylene, and 1,4-cyclohexyldimethylene.

The term "arylene" refers to a divalent group that is aromatic and, optionally, carbocyclic. The arylene has at least one aromatic ring. Any additional rings can be unsaturated, partially saturated, or saturated. Optionally, an aromatic ring can have one or more additional carbocyclic rings that are fused to the aromatic ring. Unless otherwise indicated, arylene groups often have 6 to 20 carbon atoms, 6 to 18 carbon atoms, 6 to 16 carbon atoms, 6 to 12 carbon atoms, or 6 to 10 carbon atoms.

The term "aralkylene" refers to a divalent group that is an alkylene group substituted with an aryl group or an alkylene group attached to an arylene group. The term "alkarylene" refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

The term "hydrolyzable group" refers to a group that can react with water having a pH of 1 to 10 under conditions of atmospheric pressure. The hydrolyzable group is often converted to a hydroxyl group when it reacts. The hydroxyl group often undergoes further reactions (e.g. condensation). Typical hydrolyzable groups include, but are not limited to, alkoxy, aryloxy, aralkyloxy, alkaryloxy, acyloxy, or halogen (directly boned to s silicon atom. As used herein, the term is often used in reference to one of more groups bonded to a silicon atom in a silyl group.

"Renewable resource" refers to a natural resource that can be replenished within a 100 year time frame. The resource may be replenished naturally or via agricultural techniques. The renewable resource is typically a plant (i.e. any of various photosynthetic organisms that includes all land plants, inclusive of trees), organisms of Protista such as seaweed and algae, animals, and fish. They may be naturally occurring, hybrids, or genetically engineered organisms. Natural resources such as crude oil, coal, and peat which take longer than 100 years to form are not considered to be renewable resources.

When a group is present more than once in a formula described herein, each group is "independently" selected unless specified otherwise.

Presently described are (e.g. pressure sensitive) adhesive compositions comprising at least one low Tg (meth)acrylic polymer and at least one silsesquioxane polymer crosslinker comprising a plurality of ethylenically unsaturated groups.

A silsesquioxane (SSQ) is an organosilicon compound with the empirical chemical formula $R'SiO_{3/2}$ where Si is the element silicon, O is oxygen and $R'$ is either hydrogen or an aliphatic or aromatic organic group that optionally further comprises an ethylenically unsaturated group. Thus, silsesquioxanes polymers comprise silicon atoms bonded to three oxygen atoms. Silsesquioxanes polymers that have a random branched structure are typically liquids at room temperature. Silsesquioxanes polymers that have a non-randomstructure like cubes, hexagonal prisms, octagonal prisms, decagonal prisms, and dodecagonal prisms are typically solids as room temperature.

The SSQ polymer crosslinker comprises a plurality of ethylenically unsaturated groups. The ethylenically unsaturated groups of the SSQ polymer are typically free-radically polymerizable groups such as vinyl ($H_2C=CH-$) including vinyl ethers ($H_2C=CHO-$) and alkenyl ($H_2C=CH(CH_2)_n-$ wherein $-(CH_2)_n-$ is alkylene as previously defined. The ethylenically unsaturated groups of the SSQ polymer may also be (meth)acryl such as (meth)acrylamide ($H_2C=CHCONH-$ and $H_2C=CH(CH_3)CONH-$) and (meth)acrylate($CH_2=CHCOO-$ and $CH_2=C(CH_3)COO-$). The term "(meth)acrylate" includes both methacrylate and acrylate.

Silsesquioxane polymers comprising a plurality of ethylenically unsaturated groups can be made by hydrolysis and condensation of hydrolyzable silane reactants, such as alkoxy silanes, that further comprise an ethylenically unsaturated group, as known in the art. See for example U.S. Publication No. 2014/0178698, and Provisional Patent Application Nos. 61/913,568, filed Dec. 9, 2014; 62/014,735, filed Jun. 20, 2014; and 62/014,778, filed Jun. 20, 2014; incorporated herein by reference.

In some embodiments, the silsesquioxane polymer crosslinker can be a homopolymer, characterized as a three-dimensional branched network having the formula:

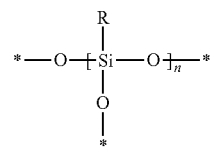

wherein R is an organic group comprising an ethylenically unsaturated group and the oxygen atom at the * is bonded to another Si atom within the three-dimensional branched network. In some embodiments, R has the formula Y—Z, as can be derived from a reactant Z—Y—Si($R^1$)$_3$, wherein $R^1$ is a hydrolyzable group, Y is a covalent bond (as depicted in the formula) or a divalent organic linking group, and Z is an ethylenically unsaturated group, as previously described.

Examples of Z—Y—Si($R^1$)$_3$ reactants include vinyltriethoxysilane, allyltriethoxysilane, allylphenylpropyltriethoxysilane, 3-butenyltriethoxysilane, docosenyltriethoxysilane, hexenyltriethoxysilane, and methacryloxylpropyltrimethoxyl silane.

In some embodiments, Y is a (e.g. $C_1$-$C_{20}$) alkylene group, a (e.g. $C_6$-$C_{12}$) arylene group, a (e.g. $C_6$-$C_{12}$)alk (e.g. $C_1$-$C_{20}$)arylene group, a (e.g. $C_6$-$C_{12}$)ar (e.g. $C_1$-$C_{20}$) alkylene group, or a combination thereof. Y may optionally further comprise (e.g. contiguous) oxygen, nitrogen, sulfur, silicon, or halogen substituents, and combinations thereof. In some embodiments, Y does not comprise oxygen or nitrogen substituents that can be less thermally stable.

The number of polymerized units, n, is at least 2, 3, 4, 5, 6, 7, 8, 9, or 10. In some embodiments, n is at least 15, 20, 25, 30, 35, 40, 45, or 50. In some embodiments, n is no greater than 500, 450, 400, 350, 300, 250 or 200.

In other embodiments, the silsesquioxane polymer crosslinker can be a copolymer, characterized as a three-dimensional branched network having the formula:

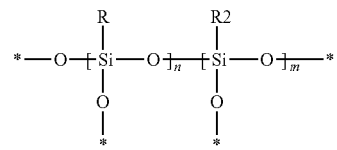

wherein R is an organic group comprising an ethylenically unsaturated group as previously described, R2 is an organic group lacking an ethylenically unsaturated group, the oxygen atom at the * is bonded to another Si atom within the three-dimensional branched network, and n is at least 2 and m is at least 1. In some embodiments, R2 has the formula Y—X, as can be derived from a reactant X—Y—Si($R^1$)$_3$, wherein $R^1$ is a hydrolyzable group, Y is a covalent bond (as depicted in the formula) or a divalent organic linking group as previously described. X is hydrogen, a (monovalent) organic group such as alkyl, aryl, aralkyl, or alkaryl that may optionally comprise halogen or other substituents; or a reactive group that is not an ethylenically unsaturated group. X may optionally further comprise (e.g. contiguous) oxygen, nitrogen, sulfur, silicon, substituents. In some embodiments, X is an optionally halogenated (e.g. $C_1$-$C_{20}$) alkyl group such as (e.g. $C_4$-$C_6$) fluoroalkyl, a (e.g. $C_6$-$C_{12}$)aryl group such as phenyl, a (e.g. $C_6$-$C_2$)alk (e.g. $C_1$-$C_{20}$)aryl group, a (e.g. $C_6$-$C_{12}$)ar(e.g. $C_1$-$C_{20}$)alkyl group. In some embodiments, X comprises an epoxide ring.

Examples of X—Y—Si($R^1$)$_3$ reactants include for example aromatic trialkoxysilanes such as phenyltrimethoxylsilane, ($C_1$-$C_{12}$) alkyl trialkoxysilanes such as methyltrimethoxylsilane, fluoroalkyl trialkoxysilanes such as nonafluorohexyltriethoxysilane, and trialkoxysilanes comprising a reactive group that is not an ethylenically unsaturated group such as glycidoxypropyltriethoxysilane; 3-glycidoxypropyltriethoxysilane 5,6-epoxyhexyltriethoxysilane; 2-(3,4-epoxycyclohexyl)ethyltriethoxysilane 3-(diphenylphosphino)propyltriethoxysilane; mercaptopropyltriethoxysilane; s-(octanoyl)mercaptopropyltriethoxysilane; 3-isocyanatopropyltriethoxysilane; hydroxy(polyethyleneoxy)propyl]triethoxysilane; hydroxymethyltriethoxysilane; 3-cyanopropyltriethoxysilane; 2-cyanoethyltriethoxysilane; and 2-(4-pyridylethyl)triethoxysilane.

Other commercially available X—Y—Si($R^1$)$_3$ reactants include for example trimethylsiloxytriethoxysilane; p-tolyltriethoxysilane; tetrahydrofurfuryloxypropyltriethoxysilane; n-propyltriethoxysilane; (4-perfluorooctylphenyl)triethoxysilane; pentafluorophenyltriethoxysilane; nonafluorohexyltriethoxysilane; 1-naphthyltriethoxysilane; 3,4-methylenedioxyphenyltriethoxysilane; p-methoxyphenyltriethoxysilane; 3-isooctyltriethoxysilane; isobutyltriethoxysilane; (heptadecafluoro-1,1,2,2-tetrahydrodecyl)triethoxysilane; 3,5-dimethoxyphenyltriethoxysilane; (n,n-diethylaminomethyl)triethoxysilane; n-cyclohexylaminomethyl)triethoxysilane; 11-chloroundecyltriethoxysilane; 3-chloropropyltriethoxysilane; p-chlorophenyltriethoxysilane; chlorophenyltriethoxysilane; butylpoly(dimethylsiloxanyl)ethyltriethoxysilane; n,n-bis(2-hydroxyethyl)-3-aminopropyltriethoxysilane; benzyltriethoxysilane; and 2-[(acetoxy(polyethyleneoxy)propyl]triethoxysilane.

The reactant X—Y—Si($R^1$)$_3$ and/or Z—Y—Si($R^1$)$_3$ comprises three $R^1$ groups. In order to form a silsesquioxane polymer at least two of the $R^1$ groups are independently a hydrolyzable group. In typical embodiments, based on commercially available reactants, each $R^1$ group is independently a hydrolyzable group. In some embodiments of $R^1$, the hydrolyzable group is selected from alkoxy, aryloxy, aralkoxy, alkaryloxy, acyloxy, and halo. In some embodiments, $R^1$ is an alkoxy group.

SSQ copolymer crosslinkers can also be prepared from at least one X—Y—Si($R^1$)$_3$ reactant and at least one Z—Y—Si($R^1$)$_3$. For example, vinyltriethoxysilane or allyltriethoxysilane can be coreacted with an alkenylalkoxylsilane such as 3-butenyltriethoxysilane and hexenyltriethoxysilane. Representative copolymers include for example vinyl-co-nonafluorohexyl silsequioxane, vinyl-co-glycidoxylpropyl silsesquioxane, vinyl-co-phenyl silsesquioxane, vinyl-co-methyl silsesquioxane, vinyl-coethyl silsesquioxane, and vinyl-co-hydro silsesquioxane.

The inclusion of the silsesquioxane compound having an R2 group that is not an ethylenically unsaturated group can be used to enhance certain properties depending on the selection of the R2 group. For example, when R2 comprises an aromatic group such as phenyl, the thermal stability can be improved (relative to a homopolymer of vinyltrimethoxylsilane). When R2 comprises a reactive group, such as an epoxy, improved hardness can be obtained (relative to a homopolymer of vinyltrimethoxysilane). Further, when R2 comprises a fluoroalkyl group, the hydrophobicity can be improved.

SSQ copolymer crosslinkers may comprise at least two different X groups (e.g. X' and X"), yet the same Y groups. Alternatively, the silsesquioxane polymers may comprise at least two different Y groups (e.g. Y' and Y"), yet the same X group. Further, the silsesquioxane polymers may comprise at least two reactants wherein both Y and X are different from each other. In such embodiment, R2 of the silsesquioxane polymer formula is independently an organic group lacking an ethylenically unsaturated group. Further, m represents the total number of repeat units independently lacking ethylenically unsaturated group.

SSQ copolymer crosslinkers can also be prepared from at least two Z—Y—Si($R^1$)$_3$ reactants. For example, vinyltriethoxylsilane can be coreacted with allyltriethoxysilane. In this embodiment, the silsesquioxane polymers may comprise at least two different Z groups (e.g. Z' and Z"), yet the same Y groups. Alternatively, the silsesquioxane polymers may comprise at least two different Y groups (e.g. Y' and Y"), yet the same Z group (e.g. vinyl). Further, the silsesquioxane polymers may comprise at least two reactants wherein both Y and Z are different from each other. In such embodiment, R is independently an organic group comprising an ethylenically unsaturated group (e.g. such as a vinyl group). Further, n represents the total number of repeat units independently comprising an ethylenically unsaturated group.

In yet other embodiments, the silsesquioxane polymer comprises a core comprising a first silsesquioxane polymer and an outer layer comprising a second silsesquioxane polymer bonded to the core wherein the silsesquioxane polymer of the core, outer layer, or a combination thereof comprises ethylenically unsaturated groups, as described in cofiled U.S. Provisional Patent Application Ser. No. 42/014,778. The SSQ polymer of the outer layer is bonded to the SSQ polymer of the core via silicon atoms bonded to three oxygen atoms. The core or outer layer may comprise the SSQ homopolymers and copolymers previously described. In some embodiments, the core has a higher concentration of ethylenically unsaturated groups than the outer layer. In other embodiments, the outer layer has a higher concentration of ethylenically unsaturated groups than the core. In some embodiments, the core is substantially free of ethylenically unsaturated groups. The core and outer layer each comprise a three-dimensional branched network of a different silsesquioxane polymer. The silsesquioxane polymers of the core and outer layer may be homopolymers or copolymers. One representative SSQ polymer crosslinker wherein the core is the reaction product of methyltrimethoxysilane and the outer layer is the reaction product of vinyltriethoxysilane is depicted in FIG. 1.

During hydrolysis, the hydrolyzable groups are converted to a hydrolyzed group, such as —OH. The Si—OH groups react with each other to form silicone-oxygen linkages such that the majority of silicon atoms are bonded to three oxygen atoms. After hydrolysis, remaining hydrolyzed (e.g. —OH) groups are preferably further reacted with end-capping agents to convert the hydrolyzed (e.g. —OH) groups to —OSi($R^3$)$_3$. The silsesquioxane polymer crosslinker comprises terminal groups having the formula —Si($R^3$)$_3$ after end-capping.

Due to the end-capping, the SSQ polymer crosslinker typically comprises little or no —OH groups. In some embodiments, the —OH groups are present in an amount of no greater than 5, 4, 3, 2, 1 or 0.5 wt-% of the SSQ polymer crosslinker. In some embodiments, the SSQ polymer crosslinker is free of —OH groups.

Various alkoxy silane end-capping agents are known. In some embodiments, the end-capping agent has the general structure $R^5$OSi($R^3$)$_3$ or O[Si($R^3$)$_3$]$_2$ wherein $R^5$ is a hydrolyzable group, as previously described and $R^3$ is independently a non-hydrolyzable group. Thus, in some embodiments $R^3$ generally lacks an oxygen atom or a halogen directly bonded to a silicon atom. $R^3$ is independently alkyl, aryl (e.g. phenyl), aralkyl, or alkaryl that optionally comprise halogen substituents (e.g. chloro, bromo, fluoro), aryl (e.g. phenyl), aralkyl, or alkaryl. The optionally substituted alkyl group may have a straight, branched, or cyclic structure. In some embodiments, $R^3$ is $C_1$-$C_{12}$ or $C_1$-$C_4$ alkyl optionally comprising halogen substituents. $R^3$ may optionally comprise (e.g. contiguous) oxygen, nitrogen, sulfur, or silicon substituents. In some embodiments, $R^3$ does not comprise oxygen or nitrogen substituents that can be less thermally stable.

A non-limiting list of illustrative end-capping agents and the resulting $R^3$ groups is as follows:

| End-capping agent | $R^3$ |
|---|---|
| n-butyldimethylmethoxysilane | n-butyldimethyl |
| t-butyldiphenylmethoxysilane | t-butyldiphenyl |
| 3-chloroisobutyldimethylmethoxysilane | 3-chloroisobutyldimethyl |
| phenyldimethylethoxysilane | phenyldimethyl |
| n-propyldimethylmethoxysilane | n-propyldimethyl |
| triethylethoxysilane | triethyl |
| trimethylmethoxysilane | trimethyl |

-continued

| End-capping agent | $R^3$ |
|---|---|
| triphenylethoxysilane | triphenyl |
| n-octyldimethylmethoxysilane | n-octyldimethyl |
| Hexamethyldisiloxane | trimethyl |
| Hexaethyldisiloxane | triethyl |
| 1,1,1,3,3,3-hexaphenyldisiloxane | triphenyl |
| 1,1,1,3,3,3-hexakis(4-(dimethylamino)phenyl)disiloxane | tri-[4-(dimethylamino)phenyl] |
| 1,1,1,3,3,3-hexakis(3-fluorobenzyl)disiloxane | tri-(3-fluorobenzyl) |

When the silsesquioxane polymer is further reacted with an end-capping agent to convert the hydrolyzed group, e.g. —OH, to —OSi($R^3$)$^3$ the silsesquioxane polymer crosslinker typically comprises a three-dimensional branched network having the formula:

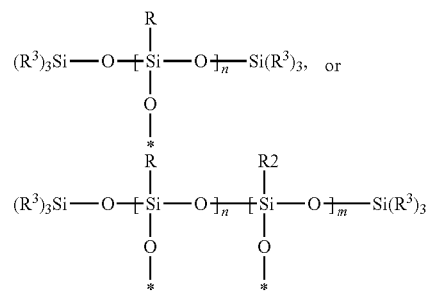

wherein:

the oxygen atom at the * is bonded to another Si atom within the three-dimensional branched network, R is an organic group comprising an ethylenically unsaturated group, R2 is an organic group that is not an ethylenically unsaturated group, $R^3$ is a non-hydrolyzable group (as previously described); and n is at least 2 and m is at least 1.

In one naming convention, the $R^3$ group derived the end-capping agent is included in the name of the SSQ polymer. For example poly(vinylsilsesquioxane) end-capped with ethoxytrimethylsilane or hexamethyldisiloxane may be named "trimethyl silyl poly(vinylsilsesquioxane)" and has the general formula:

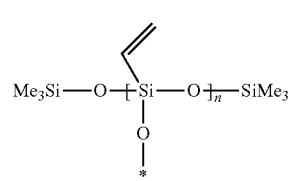

wherein the oxygen atom in the formula above at the * above is bonded to another Si atom within the three-dimensional branched network. Such three-dimensional branched network structure is depicted as follows:

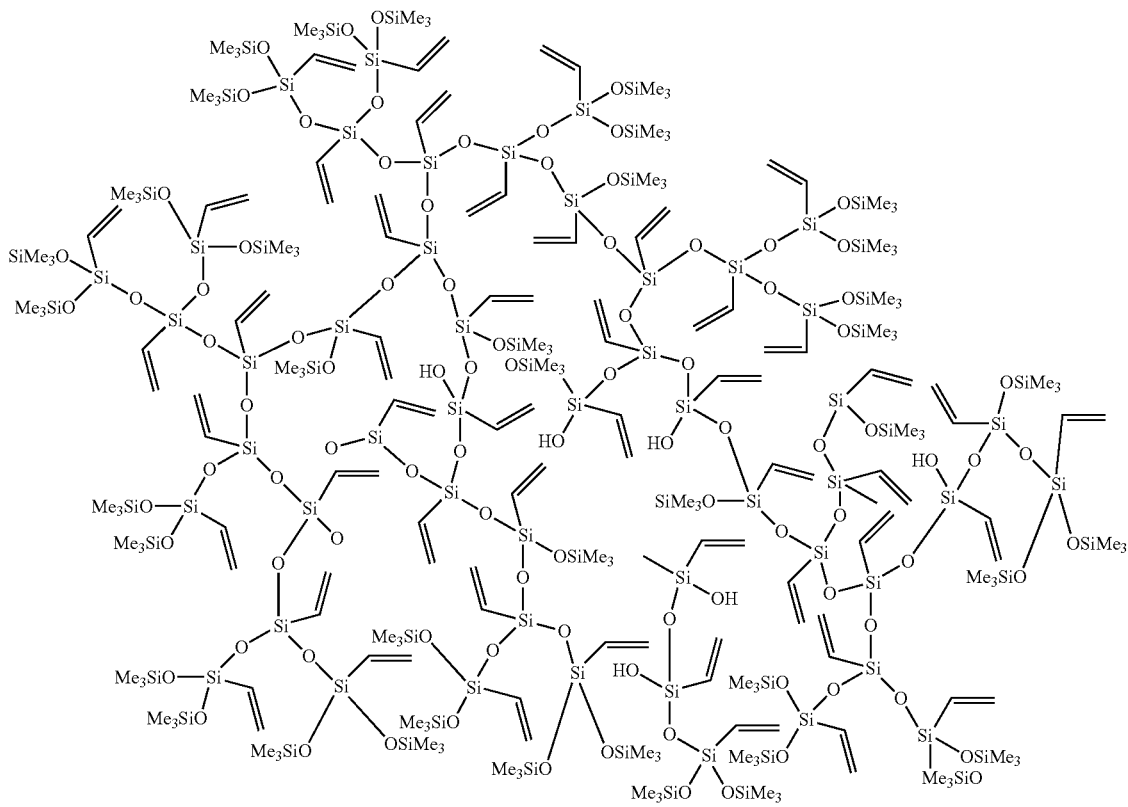

The SSQ polymer crosslinker comprises at least two ethylenically unsaturated groups. Thus, n is at least 2, 3, 4, 5, 6, 7, 8, 9, or 10. In the case of SSQ copolymer crosslinkers comprising n and m units, m is at least 1, 2, 3, 4, 5, 6, 7, 8, 9, or 10. In some embodiments, n, m, or n+m is at least 15, 20, 25, 30, 35, 40, 45, or 50. In some embodiments, n or m, or n+m is no greater than 500, 450, 400, 350, 300, 250 or 200. Thus n+m can range up to 1000. When the SSQ polymer is prepared from one or more SSQ reactants, wherein all the reactants comprise an ethylenically unsaturated group, all (i.e. 100%) of the repeat units comprise an ethylenically unsaturated group. In some embodiments, n and m are selected such the polymer comprises at least 25, 30, 35, 40, 45, or 50 mol % of repeat units comprising ethylenically unsaturated group(s) R. In some embodiments, n and m are selected such the polymer comprises no greater than 95, 90, 85, 80, 75, 70, 65, 60, or 55 mol % of repeat units comprising ethylenically unsaturated group(s) R.

The SSQ polymer crosslinker is generally combined with a low Tg (meth)acrylic polymer. The concentration of SSQ crosslinking polymer is typically at least 0.1, 0.2, 0.3, 0.4 or 0.5 wt-% and can range up to 15 or 20 wt-% of the (e.g. pressure sensitive) adhesive composition. However, as the concentration of such crosslinking polymer increases, the peel adhesion (180° to stainless steel) can decrease. Thus, in typically embodiments, the concentration of the SSQ crosslinking polymer is no greater than 10, 9, 8, 7, 6, or 5 wt-% and in some favored embodiments, no greater than 4, 3, 2, or 1 wt-%. When the SSQ polymer crosslinker comprises a relatively high number of repeat units that comprise ethylenically unsaturated groups, such as in the case of (trialkyl silyl) polyvinylsilsesquioxane homopolymer, small concentrations of SSQ polymer crosslinker can increase the shear holding power to 10,000+ minutes, However, when the SSQ polymer crosslinker comprises a lower number of repeat units that comprise ethylenically unsaturated groups, such as in the case of (trialkyl silyl) polyvinyl-co-ethyl-silsesquioxane copolymer, proportionately higher concentrations of SSQ copolymer crosslinker would be utilized to obtain comparable shear holding power.

The (e.g. pressure sensitive) adhesive composition may comprise a single SSQ polymer or a combination of two or more of such SSQ polymers. When the composition comprises a combination of SSQ polymers, the total concentration generally falls within the ranges just described.

The (meth)acrylic polymer and/or pressure sensitive adhesive comprising polymerized units derived from one or more (meth)acrylate ester monomers derived from a (e.g. non-tertiary) alcohol containing from 1 to 14 carbon atoms and preferably an average of from 4 to 12 carbon atoms. The (meth)acrylic polymer and/or pressure sensitive adhesive composition may also comprise polymerized units derived from one or more monomers (e.g. common to acrylic polymers and adhesives) such as a (meth)acrylic ester monomers (also referred to as (meth)acrylate acid ester monomers and alkyl(meth)acrylate monomers) optionally in combination with one or more other monomers such as acid-functional ethylenically unsaturated monomers, non-acid-functional polar monomers, and vinyl monomers.

Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isoctylalcohol, 2-ethyl-1-hexanol, 1-decanol, 2-propyl-heptanol, 1-dodecanol, 1-tridecanol, 1-tetradecanol, and the like. In some embodiments, a preferred (meth)acrylate ester monomer is the ester of (meth)acrylic acid with isooctyl alcohol.

In some favored embodiments, the monomer is the ester of (meth)acrylic acid with an alcohol derived from a renewable source. A suitable technique for determining whether a material is derived from a renewable resource is through $^{14}C$ analysis according to ASTM D6866-10, as described in US2012/0288692. The application of ASTM D6866-10 to derive a "bio-based content" is built on the same concepts as radiocarbon dating, but without use of the age equations. The analysis is performed by deriving a ratio of the amount of organic radiocarbon ($^{14}C$) in an unknown sample to that of a modern reference standard. The ratio is reported as a percentage with the units "pMC" (percent modern carbon).

One suitable monomer derived from a renewable source is 2-octyl (meth)acrylate, as can be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid. Other (meth)acrylate ester monomers that can be renewable are those derived from ethanol, 2-methyl butanol and dihydrocitronellol.

In some embodiments, the (meth)acrylic polymer and/or pressure sensitive adhesive composition comprises a biobased content of at least 25, 30, 35, 40, 45, or 50 wt. % using ASTM D6866-10, method B. In other embodiments, the (e.g. pressure sensitive) adhesive composition comprises a bio-based content of at least 55, 60, 65, 70, 75, or 80 wt. %. In yet other embodiments, the composition comprises a bio-based content of at least 85, 90, 95, 96, 97, 99 or 99 wt. %.

The (meth)acrylic polymer and/or pressure sensitive adhesive composition comprises one or more low Tg monomers, having a Tg no greater than 10° C. when the monomer is polymerized (i.e. independently) to form a homopolymer. In some embodiments, the low Tg monomers have a Tg no greater than 0° C., no greater than −5° C., or no greater than −10° C. when reacted to form a homopolymer. The $T_g$ of these homopolymers is often greater than or equal to −80° C., greater than or equal to −70° C., greater than or equal to −60° C., or greater than or equal to −50° C. The Tg of these homopolymers can be, for example, in the range of −80° C. to 20° C., −70° C. to 10° C., −60° C. to 0° C., or −60° C. to −10° C.

The low Tg monomer may have the formula

wherein $R_1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, for example, 2-methoxyethyl acrylate and 2-ethoxyethyl acrylate.

In some embodiments, the (meth)acrylic polymer and/or pressure sensitive adhesive composition comprises polymerized units of at least one low Tg monomer having a non-cyclic alkyl (meth)acrylate monomer(s) having 4 to 20 carbon atoms. In some embodiments, the (meth)acrylic polymer and/or (e.g. pressure sensitive) adhesive comprises at least one low Tg monomer having a (e.g. branched) alkyl group with 6 to 20 carbon atoms. In some embodiments, the low Tg monomer has a (e.g. branched) alkyl group with 7 or 8 carbon atoms. Exemplary monomers include, but are not limited to, 2-ethylhexyl methacrylate, isooctyl methacrylate, n-octyl methacrylate, 2-octyl methacrylate, isodecyl methacrylate, and lauryl methacrylate.

In some embodiments, the (meth)acrylic polymer and/or pressure sensitive adhesive composition comprises polymerized units derived from a high Tg monomer, having a Tg greater than 10° C. and typically of at least 15° C., 20° C. or 25° C., and preferably at least 50° C. Suitable high Tg monomers include, for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate (110° C., according to Aldrich), norbornyl (meth)acrylate, benzyl methacrylate, 3,3,5 trimethylcyclohexyl acrylate, cyclohexyl acrylate, N-octyl acrylamide, and propyl methacrylate or combinations.

The (meth)acrylic polymer is a copolymer of at least one low Tg monomer, optionally other monomers, as described herein. The Tg of the copolymer may be estimated by use of the Fox equation, based on the Tgs of the constituent monomers and the weight percent thereof.

The alkyl (meth)acrylate monomer polymerized units are typically present in the (meth)acrylic polymer in an amount of at least 50, 55, 60, 65, or 75 wt. % of the composition. When the composition is free of non-polymerized components such as tackifier, plasticizer, and/or filler; the concentrations described herein are also equivalent to the concentration of such polymerized units in the (meth)acrylic polymer.

In some embodiments, the (meth)acrylic polymer and/or pressure sensitive adhesive composition comprises at least 50, 55, 60, 65, 70, 75, 80, 85, 90 or 95 wt. % or greater of polymerized units derived from low Tg (e.g. alkyl) (meth) acrylate monomer(s). When high Tg monomers are included in a pressure sensitive adhesive, the adhesive may include at least 5, 10, 15, 20, to 30 parts by weight of such high Tg (e.g. alkyl) (meth)acrylate monomer(s).

The (meth)acrylic polymer may alternatively comprise less low Tg alkyl (meth)acrylate monomer(s). For example, the (meth)acrylic polymer may comprise at least 25, 30, 35, 40, or 45 wt. % of low Tg alkyl (meth)acrylate monomer in combination with high Tg alkyl (meth)acrylate monomer(s) such that the total alkyl(meth)acrylate monomer is at least 50, 55, 60, 65, or 75 wt. %.

The (meth)acrylic polymer and/or pressure sensitive adhesive composition may optionally comprise polymerized units derived from an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.5 to 15 parts by weight, preferably 0.5 to 10 parts by weight, based on 100 parts by weight total monomer.

The (meth)acrylic polymer and/or pressure sensitive adhesive composition may optionally comprise polymerized units derived from other monomers such as a non-acid-functional polar monomer.

Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth) acrylate, 2-methoxyethoxyethyl (meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone. The non-acid-functional polar monomer may be present in amounts of 0 to 10 parts by weight, or 0.5 to 5 parts by weight, based on 100 parts by weight total monomer.

When used, vinyl monomers useful in the (meth)acrylic polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer.

Due to the inclusion of a sufficient amount of low Tg (e.g. alkyl (meth)acrylate) polymerized units and/or other additives such as plasticizer and tackifier, pressure sensitive compositions described herein typically have a glass transition temperature "Tg" of no greater than 25° C., or 20° C. In some embodiments, the compositions have a Tg no greater than 15° C., 10° C., 5° C., 0° C., or −0.5° C.

The (meth)acrylic polymer and/or (e.g. pressure sensitive) adhesive may optionally comprise at least one other crosslinker, in addition to the SSQ polymer crosslinker.

In some embodiments, the pressure sensitive adhesive comprises a multifunctional (meth)acrylate crosslinking monomer. Examples of useful multifunctional (meth)acrylate include, but are not limited to, di(meth)acrylates, tri (meth)acrylates, and tetra(meth)acrylates, such as 1,6-hexanediol di(meth)acrylate, poly(ethylene glycol) di(meth) acrylates, polybutadiene di(meth)acrylate, polyurethane di(meth)acrylates, and propoxylated glycerin tri(meth)acrylate, and mixtures thereof. When utilized, the multifunctional (meth)acrylate is typically used in an amount of at least 0.05, 0.10, 0.15, 0.20 up to 1, 2, 3, 4, or 5 parts by weight, relative to 100 parts by weight of the total monomer content.

In some embodiments, the pressure sensitive adhesive comprises predominantly (greater than 50%, 60%, 70%, 80%, or 90% of the total crosslinks) or exclusively crosslinks from the SSQ polymer crosslinker. In such embodiment, the composition may be free of other crosslinking monomers, particularly multi(meth)acrylate crosslinkers such as 1,6-hexane diol diacrylate (HDDA).

The pressure sensitive adhesive may optionally contain one or more conventional additives. Preferred additives include tackifiers, plasticizers, dyes, antioxidants, UV stabilizers, and (e.g. inorganic) fillers such as (e.g. fumed) silica and glass bubbles. In some embodiments no tackifier is used. When tackifiers are used, the concentration can range from 5 or 10, 15 or 20 wt. % or greater of the (e.g. cured) adhesive composition.

Various types of tackifiers include phenol modified terpenes and rosin esters such as glycerol esters of rosin and pentaerythritol esters of rosin that are available under the trade designations "Nuroz", "Nutac" (Newport Industries), "Permalyn", "Staybelite", "Foral" (Eastman). Also available are hydrocarbon resin tackifiers that typically come from $C_5$ and $C_9$ monomers by products of naphtha cracking and are available under the trade names "Piccotac", "Eastotac", "Regalrez", "Regalite" (Eastman), "Arkon" (Arakawa), "Norsolene", "Wingtack" (Cray Valley), "Nevtack", LX (Neville Chemical Co.), "Hikotac", "Hikorez" (Kolon Chemical), "Novares" (Rutgers Nev.), "Quintone" (Zeon), "Escorez" (Exxonmobile Chemical), "Nures", and "H-Rez" (Newport Industries). Of these, glycerol esters of rosin and pentaerythritol esters of rosin, such as available under the trade designations "Nuroz", "Nutac", and "Foral" are considered biobased materials.

The (meth)acrylic copolymers can be polymerized by various techniques including, but not limited to, solvent polymerization, dispersion polymerization, solventless bulk polymerization, and radiation polymerization, including processes using ultraviolet light, electron beam, and gamma radiation. The monomer mixture may comprise a polymerization initiator, especially a thermal initiator or a photoinitiator of a type and in an amount effective to polymerize the comonomers.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature (e.g. about 40 to 100° C.) until the reaction is complete, typically in about 1 to 20 hours, depending upon the batch size and temperature. Examples of typical solvents include methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

Useful initiators include those that, on exposure to heat or light, generate free-radicals that initiate (co)polymerization of the monomer mixture. The initiators are typically employed at concentrations ranging from about 0.0001 to about 3.0 parts by weight, preferably from about 0.001 to about 1.0 parts by weight, and more preferably from about 0.005 to about 0.5 parts by weight of the total monomer or polymerized units.

Suitable initiators include but are not limited to those selected from the group consisting of azo compounds such as VAZO 64 (2,2'-azobis(isobutyronitrile)), VAZO 52 (2,2'-azobis(2,4-dimethylpentanenitrile)), and VAZO 67 (2,2'-azobis-(2-methylbutyronitrile)) available from E.I. du Pont de Nemours Co., peroxides such as benzoyl peroxide and lauroyl peroxide, and mixtures thereof. The preferred oil-soluble thermal initiator is (2,2'-azobis-(2-methylbutyronitrile)). When used, initiators may comprise from about 0.05 to about 1 part by weight, preferably about 0.1 to about 0.5 part by weight based on 100 parts by weight of monomer components in the (e.g. pressure sensitive) adhesive.

The exemplified (meth)acrylic polymer was prepared in a manner to insure that the (meth)acrylic polymer is free of ethylically unsaturated groups. Thus, in this embodiment, the SSQ polymer crosslinker is the sole component comprising ethylenically unsaturated free radically polymerizable groups. It is a surprising result that the SSQ polymer crosslinker can crosslink such (meth)acrylic polymer.

However, as evident by cofiled U.S. Provisional Patent Application Ser. No. 62/014,802, the SSQ polymer crosslinker can also crosslink (meth)acrylic polymers that comprise ethylenically unsaturated groups as well a composition that comprises a low Tg ethylenically unsaturated monomer. Thus, although the present invention does not necessitate the (meth)acrylic polymer or any other component of the pressure sensitive adhesive to comprise ethylenically unsaturated free radically polymerizable groups for the crosslinking to occur, the presence of ethylenically unsaturated groups does not detract from such crosslinking Thus, when the pressure sensitive adhesive composition comprises a sufficient concentration of ethylenically unsaturated groups, the ethylenically unsaturated groups of the SSQ polymer crosslinker are surmised to polymerize with the ethylenically unsaturated groups of the composition, as described in U.S. Provisional Patent Application Ser. No. 62/014,802, filed Jun. 20, 2014. However, when the pressure sensitive adhesive composition does not comprise a sufficient concentration of ethylenically unsaturated groups to obtain the desired degree of polymerization by the reaction of such ethylenically unsaturated groups with the SSQ polymer crosslinker, the (meth)acrylic polymer crosslinks by an alternative mechanism as exemplified herein.

The polymerization of the (meth)acrylic polymer by means of the SSQ polymer crosslinker is typically conducted in the presence of solvents such as ethyl acetate, toluene and tetrahydrofuran, which are non-reactive with the ethylenically unsaturated groups of the SSQ polymer The pressure sensitive adhesive further comprises a free radical initiator. Free-radical generating photoinitiators include Norrish Type I type reactions, which are commonly referred to as alpha cleavage type initiators. The Norrish Type I reactions can be characterized as the photochemical cleavage of aldehydes and ketones. Various aryl ketone and aryl aldehyde groups that are capable of Norrish Type I type cleavage are known, some of which are described in U.S. Pat. No. 5,506,279 (Gaddam et al.).

Free-radical generating photoinitiators can also be Norrish Type II type reactions, which are commonly referred to as alpha cleavage type initiators. Various groups that are capable of Norrish Type II cleavage are also known, some of which are described in U.S. Pat. No. 5,773,485 (Gaddam et al.).

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime. Particularly preferred among these are the substituted acetophenones.

Polymerizable photoinitiators may also be utilized such as those described in previously cited U.S. Pat. Nos. 5,506,279 and 5,773,485.

A single photoinitiator or a combination of photoinitiators may be utilized. The photoinitiator(s) are typically present in an amount of from 0.1 to 1.0 part by weight, relative to 100 parts by weight of the total (meth)acrylic polymer.

The composition and the photoinitiator may be irradiated with activating UV radiation to crosslink the (meth)acrylic polymer. UV light are typically relatively high light intensity sources such as medium pressure mercury lamps which provide intensities generally greater than 10 mW/cm$^2$, preferably 15 to 450 mW/cm$^2$. For efficient processing, high intensities and short exposure times are preferred. For example, an intensity of 600 mW/cm$^2$ and an exposure time of about 1 second may be used successfully. Intensities can range from 0.1 to 150 mW/cm$^2$, preferably from 0.5 to 100 mW/cm$^2$, and more preferably from 0.5 to 50 mW/cm$^2$.

The change in 180° peel adhesion to stainless steel and gel content can be indicative of the extent of crosslinking. For example, a reduction is peel adhesion by about 10-20% of the average value can be indicative of low levels of crosslinking A gel content ranging from about 20 to 50% can be indicative of moderate levels of crosslinking Gel contents ranging from greater than 50% (e.g. 55 or 60%) to about 80% can be indicative of high levels of crosslinking, accompanied by shear holding power in excess of 10,000 minutes.

In some embodiments, the pressure sensitive adhesive comprises fumed silica. Fumed silica, also known as pyrogenic silica, is made from flame pyrolysis of silicon tetrachloride or from quartz sand vaporized in a 3000° C. electric arc. Fumed silica consists of microscopic droplets of amorphous silica fused into (e.g. branched) three-dimensional primary particles that aggregate into larger particles. Since the aggregates do not typically break down, the average particle size of fumed silica is the average particle size of the aggregates. Fumed silica is commercially available from various global producers including Evonik, under the trade designation "Aerosil"; Cabot under the trade designation "Cab-O-Sil", and Wacker Chemie-Dow Corning. The BET surface area of suitable fumed silica is typically at least 50 m$^2$/g, or 75 m$^2$/g, or 100 m$^2$/g. In some embodiments, the BET surface area of the fumed silica is no greater than 400 m$^2$/g, or 350 m$^2$/g, or 300 m$^2$/g, or 275 m$^2$/g, or 250 m$^2$/g. The fumed silica aggregates preferably comprise silica having a primary particle size no greater than 20 nm or 15 nm. The aggregate particle size is substantially larger than the primary particle size and is typically at least 100 nm or greater.

The concentration of (e.g. fumed) silica can vary. In some embodiments, the (e.g. pressure sensitive) adhesive comprises at least 0.5, 1. 0, 1.1, 1.2, 1.3, 1.4, or 1.5 wt-% of (e.g. fumed) silica and in some embodiments no greater than 5, 4, 3, or 2 wt-%. In other embodiments, the adhesive comprises at least 5, 6, 7, 8, 9, or 10 wt-% of (e.g. fumed) silica and typically no greater than 20, 19, 18, 17, 16, or 15 wt-% of (e.g. fumed) silica.

In some embodiments, the pressure sensitive adhesive comprises glass bubbles. Suitable glass bubbles generally have a density ranging from about 0.125 to about 0.35 g/cc. In some embodiments, the glass bubbles have a density less than 0.30, 0.25, or 0.20 g/cc. Glass bubbles generally have a distribution of particles sizes. In typical embodiments, 90% of the glass bubbles have a particle size (by volume) of at least 75 microns and no greater than 115 microns. In some embodiments, 90% of the glass bubbles have a particle size (by volume) of at least 80, 85, 90, or 95 microns. In some embodiments, the glass bubbles have a crush strength of at least 250 psi and no greater than 1000, 750, or 500 psi. Glass bubbles are commercially available from various sources including 3M, St. Paul, Minn.

The concentration of glass bubbles can vary. In some embodiments, the adhesive comprises at least 1, 2, 3, 4 or 5 wt-% of glass bubbles and typically no greater than 20, 15, or 10 wt-% of glass bubbles.

The inclusion of glass bubbles can reduce the density of the adhesive. Another way of reducing the density of the adhesive is by incorporation of air or other gasses into the adhesive composition. For example the adhesive composition can be transferred to a frother as described for examples in U.S. Pat. No. 4,415,615; incorporated herein by reference. While feeding nitrogen gas into the frother, the frothed composition can be delivered to the nip of a roll coater between a pair of transparent, (e.g. biaxially-oriented polyethylene terephthalate) films. A silicone or fluorochemical surfactant is typically included in the froathed composition. Various surfactants are known including copolymer surfactants described in U.S. Pat. No. 6,852,781.

In some embodiments no tackifier is used. When tackifiers are used, the concentration can range from 5 or 10 wt-% to 40, 45, 50, 55, or 60 wt-% of the (e.g. cured) adhesive composition.

Various types of tackifiers include phenol modified terpenes and rosin esters such as glycerol esters of rosin and pentaerythritol esters of rosin that are available under the trade designations "Nuroz", "Nutac" (Newport Industries), "Permalyn", "Staybelite", "Foral" (Eastman). Also available are hydrocarbon resin tackifiers that typically come from $C_5$ and $C_9$ monomers by products of naphtha cracking and are available under the trade names "Piccotac", "Eastotac", "Regalrez", "Regalite" (Eastman), "Arkon" (Arakawa), "Norsolene", "Wingtack" (Cray Valley), "Nevtack", LX (Neville Chemical Co.), "Hikotac", "Hikorez" (Kolon Chemical), "Novares" (Rutgers Nev.), "Quintone" (Zeon), "Escorez" (Exxonmobile Chemical), "Nures", and "H-Rez" (Newport Industries). Of these, glycerol esters of rosin and pentaerythritol esters of rosin, such as available under the trade designations "Nuroz", "Nutac", and "Foral" are considered biobased materials.

Depending on the kinds and amount of components, the pressure sensitive adhesive can be formulated to have a wide variety of properties for various end uses. In some embodiments, the adhesive is cleanly removable from stainless steel and the 180° peel adhesion (according to test method described in the forthcoming examples) is at least 10, 25, 50, 75 or 100 N/dm and can range up to 200 N/dm or greater. In some embodiments, the shear holding power is greater than 10,000 minutes (according to test method described in the forthcoming examples)

The adhesives may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. In some embodiments, the backing is comprised of a bio-based material such as polylactic acid (PLA). Foam backings may be used. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings Such treatments are typically selected based on the nature of the materials of the adhesive and of the foam or backing and include primers and surface modifications (e.g., corona treatment, surface abrasion).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with (e.g. pressure sensitive) adhesive compositions such as labels, tapes, signs, covers, marking indicia, and the like.

In some embodiments, the backing material is a transparent film having a transmission of visible light of at least 90 percent. The transparent film may further comprise a graphic. In this embodiment, the adhesive may also be transparent.

The above-described compositions can be coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary as previously described. The composition may be of any desirable concentration for subsequent coating, but is typically 5 to 20 wt-% polymer solids in monomer. The desired concentration may be achieved by further dilution of the coating composition, or by partial drying. Coating thicknesses may vary from about 25 to 1500 microns (dry thickness). In typical embodiments, the coating thickness ranges from about 50 to 250 microns.

The adhesive can also be provided in the form of a (e.g. pressure sensitive) adhesive transfer tape in which at least one layer of the adhesive is disposed on a release liner for application to a permanent substrate at a later time. The adhesive can also be provided as a single coated or double coated tape in which the adhesive is disposed on a permanent backing.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner. Additional tape constructions include those described in U.S. Pat. No. 5,602,221 (Bennett et al.), incorporated herein by reference.

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

TABLE 1

Materials

| Designation | Description and Source |
|---|---|
| IOA | Isooctyl acrylate, available from 3M Company, St. Paul, MN |
| AA | Acrylic acid, available from Alfa Aesar, Ward Hill, MA |
| IRG651 | 2,2-Dimethoxy-1,2-diphenylethan-1-one, an initiator available from BASF Corporation, Florham Park, NJ, under the trade designation "IRGACURE 651" |
| KB1 | 2,2-dimethoxy-1,2-di(phenyl)ethanone, available from Lamberti USA, Inc., Conshohocken, PA, under the trade designation "ESACURE KB1" |
| VAZO-67 | An initiator available from DuPont, Wilmington, DE, under the trade designation "VAZO-67" |

180° Peel Adhesion Test

Peel adhesion strength was measured at a 180° angle using an IMASS SP-200 slip/peel tester (available from IMASS, Inc., Accord Mass.) at a peel rate of 305 mm/minute (12 inches/minute). Stainless steel test panels were cleaned by wiping the substrate panels with a tissue wetted with isopropanol using heavy hand pressure to wipe the test panel 8 to 10 times. This procedure was repeated two more times with clean tissues wetted with solvent. The cleaned panel was allowed to air dry for 30 minutes. The adhesive tape was cut into strips measuring 1.27 cm×20 cm (½ in.×8 in.) and the strips were rolled down onto the cleaned panel with a 2.0 kg (4.5 lb.) rubber roller using 2 passes. The prepared samples were stored at 23° C./50% relative humidity for different periods of aging times, typically 1 h, before testing. The peel strengths reported were the average result of 3-5 repeated experiments.

Shear Holding Power Test

Shear holding power (i.e., static shear strength) was evaluated at 23° C./50% relative humidity using 1 Kg load. Tape test samples measuring 1.27 cm by 15.24 cm (½ in. by 6 in.) were adhered to 1.5 inch by 2 inch (~3.8 by 5.1 cm) stainless steel (SS) panels using the method to clean the panel and attach the tape described in the peel adhesion test. The tape overlapped the panel by 1.27 cm by 2.54 cm (½ in. by 1 in.), and the strip was folded over itself on the adhesive side, and then folded again. A hook was hung in the second fold and secured by stapling the tape above the hook. The weight was attached to the hook and the panels were hung in a 23° C./50% RH room. The time to failure in minutes was recorded. If no failure was observed after 10,000 minutes, the test was stopped and a value of 10,000+ minutes was recorded. The modes of failure were recorded. If there were adhesive residue on the SS test panel as well as on the backing, then a "cohesive" failure was recorded. If the adhesive remained attached on the backing, then the failure was recorded as an "adhesive" failure.

Gel Content Test Method

Percent get (gel content) was determined in generally similar manner as described in ASTM D3616-.95 (as specified in 2009), with the following modifications, A test specimen measuring 63/64 inch (2.50 cm) in diameter was die-cut from a tape coated with crosslinked pressure-sensitive adhesive. The specimen was placed in a mesh basket measuring 1.5 inch (~3.8 cm) by 1.5 inch (~3.8 cm). The basket with the specimen was weighed to the nearest 0.1 mg and placed in a capped jar containing sufficient amount of ethyl acetate to cover the sample. After 24 hours the basket (containing the specimen) was removed, drained and placed in an oven at 120° C. for 30 minutes. The percent gel was determined by calculating the ratio of (a) the weight of the remaining unextracted portion of the adhesive sample to (b) the weight of the adhesive sample before extraction. To correct for the weight of the tape backing, a disc of the uncoated backing material of the same size as the test specimen was die-cut and weighed. The formula used for percent gel determination was as shown immediately below:

$$\text{Percent Gel(percent by weight)} = 100 \times \frac{(\text{unextracted sample wt. after extraction} - \text{backing wt.})}{(\text{original sample wt.} - \text{backing wt.})}$$

Preparatory Example 1 (PE-1): Trimethyl Silyl Polyvinylsilsesquioxane ("PVSSQ")

VinylTEOS (100 g), deionized (DI) water (50 g), and oxalic acid (0.5 g) were mixed together at room temperature in a 500 mL round bottom flask equipped with a condenser. Ethoxytrimethylsilane (20 g) was then added, and the resulting mixture was stirred at room temperature for 6-8 hours followed by the evaporation of the solvents (water/ethanol mixture). The resulting liquid was dissolved in methyl ethyl ketone ("MEK", 100 mL) and washed three-times with DI water (100 mL). After washing, the MEK was evaporated under reduced pressure to yield polymer product polyvinylsilsesquioxane as a viscous liquid.

Preparatory Example 2 (PE-2): Preparation of 95:5 (w/w) poly(IOA:AA)

An 87 g portion of IOA, 4.6 g of AA, 0.045 g of VAZO-67, and 214 g of ethyl acetate were combined in a transparent glass jar. Nitrogen gas was purged through the mixture for 10 minutes. The jar was then tightly capped and placed inside a Launderometer filled with water maintained at a temperature of 60° C. After 24 hours, the glass jar was removed from the Launderometer and the cap was opened, resulting in termination of the polymerization reaction. The concentration of the PE-2 material (i.e., 95:5 (w/w) poly (IOA:AA)) as a polymer solution in ethyl acetate was estimated to be 27.3% solids by weight.

Example 1 (EX-1)

An adhesive tape EX-1 was prepared as follows. A sample of the polymer solution of PE-2 in ethyl acetate (est. 27.3 wt. % solids) was combined with the relative amounts of KB-1 and PVSSQ (PE-1) indicated in Table 2 ("pbw" is parts by weight of solids) to form a coating mixture. The coating mixture was coated onto a PET backing (Mitsubishi 3SAB) using a notch bar coater with a knife gap of 15 mils (~380 micrometers). The wet coating was then dried in an oven at 70° C. for 15 minutes, resulting in a dried PSA coating thickness of 2.7 mils (~69 micrometers). The dried coating was cooled back to room temperature and then irradiated with UV radiation. A high intensity UV light with a D-bulb was used, at a dose of 1000 mJ/cm² of UVB.

Examples 2 to 10 (EX-2 to EX-10)

Adhesive tapes EX-2 to EX-10 were prepared according to the procedure described for EX-1, except using the amounts summarized in Table 2.

TABLE 2

Composition and process conditions for PSA tapes

| Sample | PE-2 (IOA:AA, 95:5 w/w) pbw | KB1 pbw | PVSSQ pbw | PSA Thickness Mils (micrometers) | UV dose mJ/cm², UVB |
|---|---|---|---|---|---|
| Comp EX-1 | 100 | 0 | 0.00 | 2.7 (69) | 1000 |
| Comp EX-2 | 100 | 0.3 | 0.00 | 2.5 (64) | 1000 |
| EX-3 | 100 | 0.3 | 0.15 | 2.5 (64) | 1000 |
| EX-4 | 100 | 0.3 | 0.30 | 2.5 (64) | 1000 |
| EX-5 | 100 | 1 | 0.50 | 2.1 (53) | 1000 |
| EX-6 | 100 | 1 | 0.75 | 2.1 (53) | 1000 |
| EX-7 | 100 | 1 | 1.00 | 2.1 (53) | 1000 |
| EX-8 | 100 | 1 | 1.65 | 2.0 (51) | 1000 |
| EX-9 | 100 | 1 | 2.50 | 2.0 (51) | 1000 |
| EX-10 | 100 | 1 | 4.00 | 1.8 (46) | 1000 |

The "180° Peel Adhesion Test", "Shear Holding Power Test", and "Gel Content Test" was performed on the adhesive tapes of EX-1 to EX-10, using samples aged for 1 week, and with results as summarized in Table 3 ("coh" designated a "cohesive" failure mode; "NA" designated "not applicable"; and "ND" designated "not determined").

TABLE 3

| Sample | 180° Peel Adhesion, samples aged for 1 week oz/in (N/dm) | failure mode | Shear Holding Power, samples aged for 1 week minutes | failure mode | Gel Content % by weight |
|---|---|---|---|---|---|
| Comp EX-1 | 118 (129) | coh | 4 | coh | ND |
| Comp EX-2 | 118 (129) | coh | 5 | coh | ND |
| EX-3 | 94 (103) | coh | 5 | coh | ND |
| EX-4 | 80 (88) | coh | 5 | coh | ND |
| EX-5 | 34 (37) | clean | 31 | coh | 32 |
| EX-6 | 31 (34) | clean | 119 | coh | 56 |
| EX-7 | 31 (34) | clean | 10,000+ | NA | 67 |
| EX-8 | 23 (25) | clean | 10,000+ | NA | 70 |
| EX-9 | 22 (24) | clean | 10,000+ | NA | 75 |
| EX-10 | 10 (11) | clean | 10,000+ | NA | 79 |

What is claimed is:

1. A pressure sensitive adhesive composition comprising:
   at least one low glass transition temperature (Tg) (meth)acrylic polymer having a Tg no greater than 10° C.,
   a free-radical initiator; and
   at least one silsesquioxane (SSQ) polymer crosslinker comprising a plurality of ethylenically unsaturated groups independently selected from vinyl ether and alkenyl.

2. The pressure sensitive adhesive composition of claim 1 wherein the low Tg (meth)acrylic polymer comprises at least 50 wt-% of polymerized units derived from one or more low Tg ethylenically unsaturated monomer.

3. The pressure sensitive adhesive composition of claim 2 wherein the one or more low Tg ethylenically unsaturated monomer is an alkyl (meth)acrylate comprising 4 to 20 carbon atoms.

4. The pressure sensitive adhesive composition of claim 1 wherein the low Tg (meth)acrylic polymer further comprises polymerized units derived from at least one monomer selected from acid-functional monomers, non-acid functional polar monomers, vinyl monomers, and combinations thereof.

5. The pressure sensitive adhesive composition of claim 1 wherein the low Tg (meth)acrylic polymer comprises ethylenically unsaturated groups and/or the pressure sensitive adhesive further comprises a component comprising an ethylenically unsaturated group.

6. The pressure sensitive adhesive composition of claim 1 wherein the free-radical initiator is an alpha cleavage photoinitiator.

7. The pressure sensitive adhesive composition of claim 1 wherein the composition comprises 0.1 to 20 wt. % of the silsesquioxane polymer crosslinker.

8. The pressure sensitive adhesive composition of claim 1 wherein the silsesquioxane polymer crosslinker comprises a three-dimensional branched network having the formula:

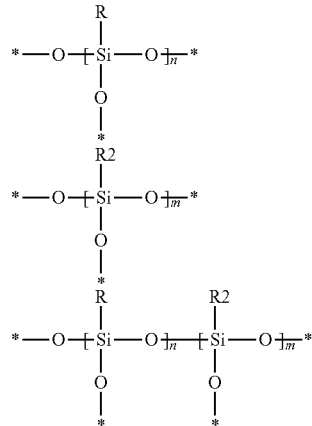

wherein:
   the oxygen atom at the * is bonded to another Si atom within the three-dimensional branched network;
   R is an organic group comprising the ethylenically unsaturated group selected from vinyl ether and alkenyl;
   R2 is an organic group that is not an ethylenically unsaturated group; and
   n is at least 2 and m is at least 1.

9. The pressure sensitive adhesive composition of claim 8 wherein R has the formula Y—Z or Z, wherein Y is the depicted covalent bond or Y is a divalent organic linking group, and Z is the ethylenically unsaturated group selected from vinyl ether and alkenyl.

10. The pressure sensitive adhesive composition of claim 8 wherein R2 has the formula Y—X, wherein Y is the depicted covalent bond or Y is a divalent organic linking group, and X is hydrogen; alkyl, aryl, alkaryl, aralkyl that optionally comprise substituents; or a reactive group that is not an ethylenically unsaturated group.

11. The pressure sensitive adhesive composition of claim 8 wherein n and m are no greater than 500.

12. The pressure sensitive adhesive composition of claim 1 wherein the silsesquioxane polymer crosslinker comprises a core comprising a first silsesquioxane polymer and an outer layer comprising a second silsesquioxane polymer bonded to the core, wherein the core, outer layer, or a combination thereof, comprises the ethylenically unsaturated groups selected from vinyl ether and alkenyl.

13. The pressure sensitive adhesive composition of claim 12 wherein the outer layer is bonded to the core via silicon atoms boned to three oxygen atoms.

14. The pressure sensitive adhesive composition of claim 1 wherein the silsesquioxane polymer crosslinker comprises terminal groups having the formula —Si($R^3$)$_3$ wherein $R^3$ is independently selected from alkyl, aryl, aralkyl, or alkaryl that optionally comprise substituents.

15. The pressure sensitive adhesive composition of claim 1 wherein the silsesquioxane polymer crosslinker comprise —OH groups present in an amount of no greater than 5 wt-% of the silsesquioxane polymer.

16. A crosslinked composition comprising the pressure sensitive adhesive composition of claim 1; wherein the composition is free-radically cured.

17. A pressure sensitive adhesive article comprising the pressure sensitive adhesive composition of claim 1 on a substrate; wherein the composition is free-radically cured.

18. The pressure sensitive adhesive article of claim 17 wherein the substrate is a backing or a release liner.

19. A method of preparing an article comprising:
   a) providing a composition according to claim 1;
   b) applying the composition to a substrate; and
   c) irradiating the applied composition thereby crosslinking the (meth)acrylic polymer.

\* \* \* \* \*